United States Patent [19]

Hara et al.

[11] 4,345,472

[45] Aug. 24, 1982

[54] METHOD AND APPARATUS FOR DIGITALLY ANALYZING DYNAMIC UNBALANCE OF A ROTATING BODY

[75] Inventors: Yoshihumi Hara, Hirakata; Saburo Kubota, Kadoma; Akira Ihara, Kyoto; Masaru Kishimoto, Nara; Masaki Suzuki, Hirakata, all of Japan

[73] Assignee: Matsushita Electric Industrial Company, Limited, Osaka, Japan

[21] Appl. No.: 158,821

[22] Filed: Jun. 12, 1980

[30] Foreign Application Priority Data

Jun. 13, 1979 [JP] Japan .................................. 54-74818

[51] Int. Cl.³ ............................................. G01M 1/22
[52] U.S. Cl. ........................................ 73/462; 364/508
[58] Field of Search ........................... 73/462; 364/508

[56] References Cited

U.S. PATENT DOCUMENTS 3,336,809 8/1967 Hack ...................................... 73/462
4,109,312 8/1978 Beutel ................................. 364/508

OTHER PUBLICATIONS

"A Digital Force Transducer", by Dorrity et al., from "IEEE Transactions on Instrumentation and Measurement", vol. IM26, No. 4, Dec. 1977.

*Primary Examiner*—James J. Gill
*Attorney, Agent, or Firm*—Lowe, King, Price & Becker

[57] ABSTRACT

Mechanical vibration of a rotating test body is translated into a periodic signal which represents a combined vector of the unbalance means of the rotating body and the mechanism that rotates it. The periodic signal is divided into two orthogonal vector components. The magnitude of the two vector components are converted into digital signals and applied to a computer. Unknown values of four constants are determined by a preliminary test having three successive stages. In the first and second stages the test body is rotated to register the digital signals; in the second state the angular position of the test body is displaced a predetermined amount with respect to its first stage position. In the third stage of the test, a trial dead weight of a known mass is mounted on the test body and rotated to register the digital signals. The computer operates on the registered digital signals to determine the four constants in accordance with a set of equations. After the preliminary test, the data registered in the first stage of the preliminary test is substituted into another set of equations using the four constants to determine the dynamic unblance mass and its angular location.

5 Claims, 10 Drawing Figures

FIG. 9

| Vx (1st) | Vx (2nd) | Vx (3rd) | Vx (4th) | Vx (5th) | Vx (6th) | Vx (7th) | Vx (8th) |
|---|---|---|---|---|---|---|---|
| Vx (9th) | Vx (10th) | Vx (11th) | Vx (12th) | Vx (13th) | Vx (14th) | Vx (15th) | Vx (16th) |
| Vx (17th) | Vx (18th) | Vx (19th) | Vx (20th) | Vy (1st) | Vy (2nd) | Vy (3rd) | Vy (4th) |
| Vy (5th) | Vy (6th) | Vy (7th) | Vy (8th) | Vy (9th) | Vy (10th) | Vy (11th) | Vy (12th) |
| Vy (13th) | Vy (14th) | Vy (15th) | Vy (16th) | Vy (17th) | Vy (18th) | Vy (19th) | Vy (20th) |
| AVERAGE Vx | AVERAGE Vy | ENTRY COUNT NO. | Vx1 | Vy1 | Vx2 | Vy2 | Vx3 |
| Vy3 | α | γ | w | k | a | b | δ |
| Uw | φw | | | | | | |

METHOD AND APPARATUS FOR DIGITALLY ANALYZING DYNAMIC UNBALANCE OF A ROTATING BODY

BACKGROUND OF THE INVENTION

The present invention relates generally to analyzing the dynamic unbalance of a rotating body, and in particular to a method of and apparatus for analyzing such unbalances using a computer for deriving digital data representing the magnitude and angular location of an unbalance mass of the rotating body.

Since an excessive amount of unbalance mass of a rotating body produces vibration and noise, and considerably reduces the life span of the whole rotating mechanism, the magnitude and angular location of the unbalance mass desirably analyzed with a great degree of precision. This is of importance to high-speed, high precision type rotating systems, in particular to an automatic correcting machine in which the unbalance mass is removed in response to analyzed data. However, in prior art systems input variables are analyzed by analog circuits and output variables are indicated on an analog display unit. On the other hand, low cost, digital unbalance correcting machines have been developed as a result of the recent introduction of low cost microcomputers and numerical control systems, with the result that the output variables of the unbalance analyzing apparatus are of digital values. The use of prior art analyzing apparatus necessitates analog-to-digital conversion of the analog output data before it is applied to the correcting machine. This would constitute an obstacle to the creation of an automatic process in which the analysis and correction of an unbalance mass are automatically processed and to the improvement of data precision.

Furthermore, in applications where the unbalance correction is made manually by an operator, the analog indicator must be read off, involving an error on the part of the operator.

SUMMARY OF THE INVENTION

Therefore, an object of the present invention is to provide a method of and an apparatus for analyzing an unbalance mass of a rotating body in which the magnitude and angular location of the unbalance mass of the body are digitally analyzed to produce digital data.

The mechanical vibration of a rotating body under the action of an unbalance mass of the body is translated into a periodic signal by means of an electromechanical transducer. According to the invention the signal is divided into two vector components having a predetermined of phase difference between them. The vector component signals are smoothed into d.c. signals which are in turn converted into digital values. A computer operates on the digital scaler values of the vector components in accordance with a programmed sequence of instructions. The rotating mechanism involves a certain amount of unbalance mass which adds up to the unbalance mass of the rotating body, producing a combined vector of the two unbalance masses. In a specific aspect of the invention, precision analysis of the combined vector can be achieved by a preliminary test having three successive stages in the first two stages the rotating body is located in different angular positions, while in the third stage of which a trial dead weight is located on the rotating body in a specified position. With this preliminary test, four unknown constant values of a vector diagram are determined by the computer and stored therein for later use in computing the digital values of the magnitude and angular position of the unbalanced mass of the rotating body.

BRIEF DESCRIPTION OF THE DRAWINGS

The invention is further described by way of example with reference to the accompanying drawings, in which:

FIG. 9 is an illustration of a temporary memory or RAM of the computer.

DETAILED DESCRIPTION

Figure 1:
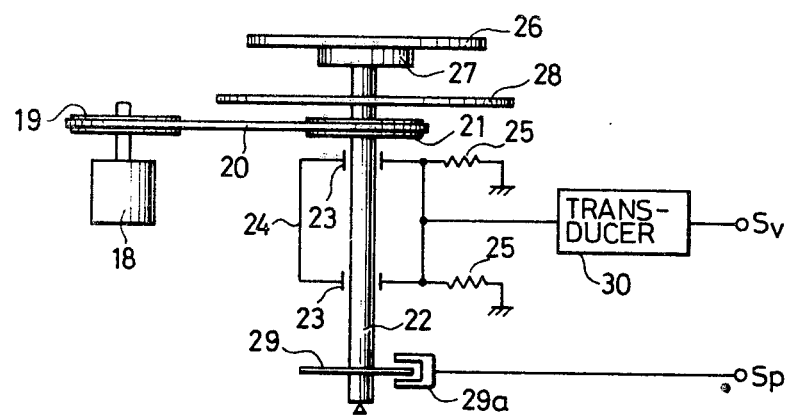
FIG. 1 is a schematic diagram of the rotating mechanism of the invention with a test body being mounted.
Figure 2:
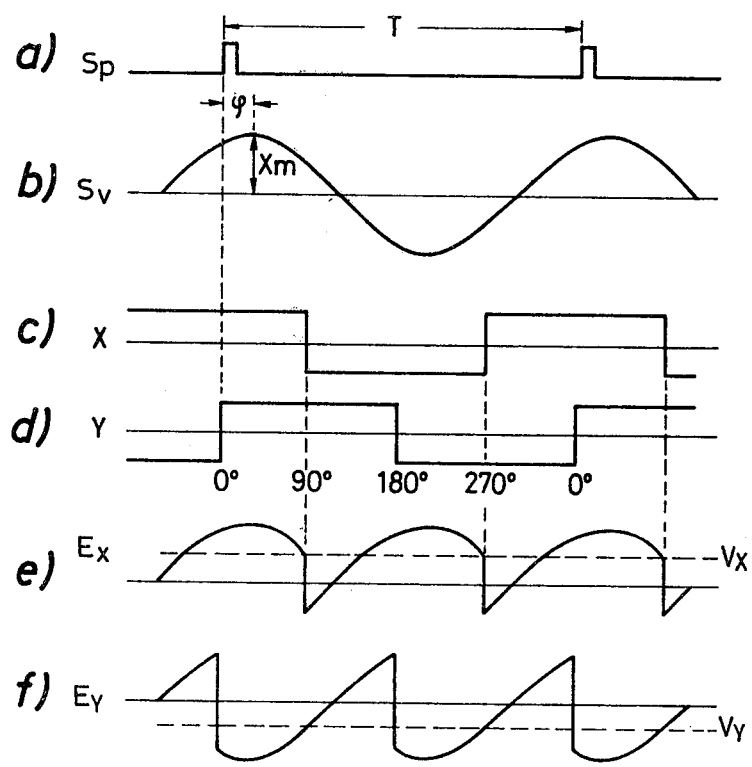
FIG. 2 is an illustration of various waveforms useful for describing the operation of the invention.

Referring now to FIG. 1, a conventional rotating mechanism is shown for purposes of disclosure. The mechanism comprises a vertical rotary shaft 22 to which is secured a mounting base 27, an indicator disc 28 and a pulse generating disc 29. The shaft 22 is turned by a motor 18 through pulleys 19, 21 and an endless belt 20 supported therebetween. Between the pulley 21 and disc 29 is provided a bearing system which includes a pair of vertically spaced radial bearings 23 which are secured together by a frame 24. The frame 24 is in turn secured to a support by means of springs 25 to transmit transverse vibration of the shaft 22 to an electromechanical transducer 30. The disc 29 is provided with a notch, or protrusion or any other indexing marker on the periphery thereof at a reference angular position. A proximity sensor 29a, such as photoelectrical or electromagnetic sensor, is located adjacent the disc 29 to generate a reference pulse for each revolution of the shaft 22 as it rotates past the reference angular position. A test body 26 is mounted on the base 27 for rotation therewith. The output signal Sv of transducer 30 is therefore indicative of the vibration of the vertical shaft 22 which results from unbalance mass in the test body 26 and in the rotary mechanism including the shaft 22. Signal Sv has a sinusoidal waveshape which is synchronized with the rotation of the shaft 22 and hence with the reference pulse Sp, there is a phase difference between the maximum value Xm, of signal Sv and the leading edge of pulse Sp as illustrated in FIGS. 2a and 2b.

Figure 4:
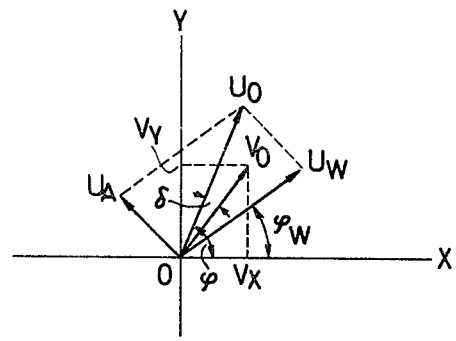
FIG. 4 is an illustration of a vector diagram of the unbalance mass of the rotating test body in relation to the unbalance mass of the rotating system.

The resultant vibration at the bearing support frame 24 is represented by a combined vector $\vec{U}_O$ having two orthogonal vector components $U_W$ and $U_A$ which are respectively attributable to the unbalance mass of the test body 26 and to the unbalance mass of the shaft 22 and its attached elements, as illustrated in the vector diagram of FIG. 4. The magnitude or scaler value of the vector $\vec{U_O}$ is proportional to the amplitude Xm of the periodic signal Sv and its angle is displaced by $\phi°$ with respect to the reference angular position corresponding to the X axis of the vector diagram of FIG. 4.

Figure 3:
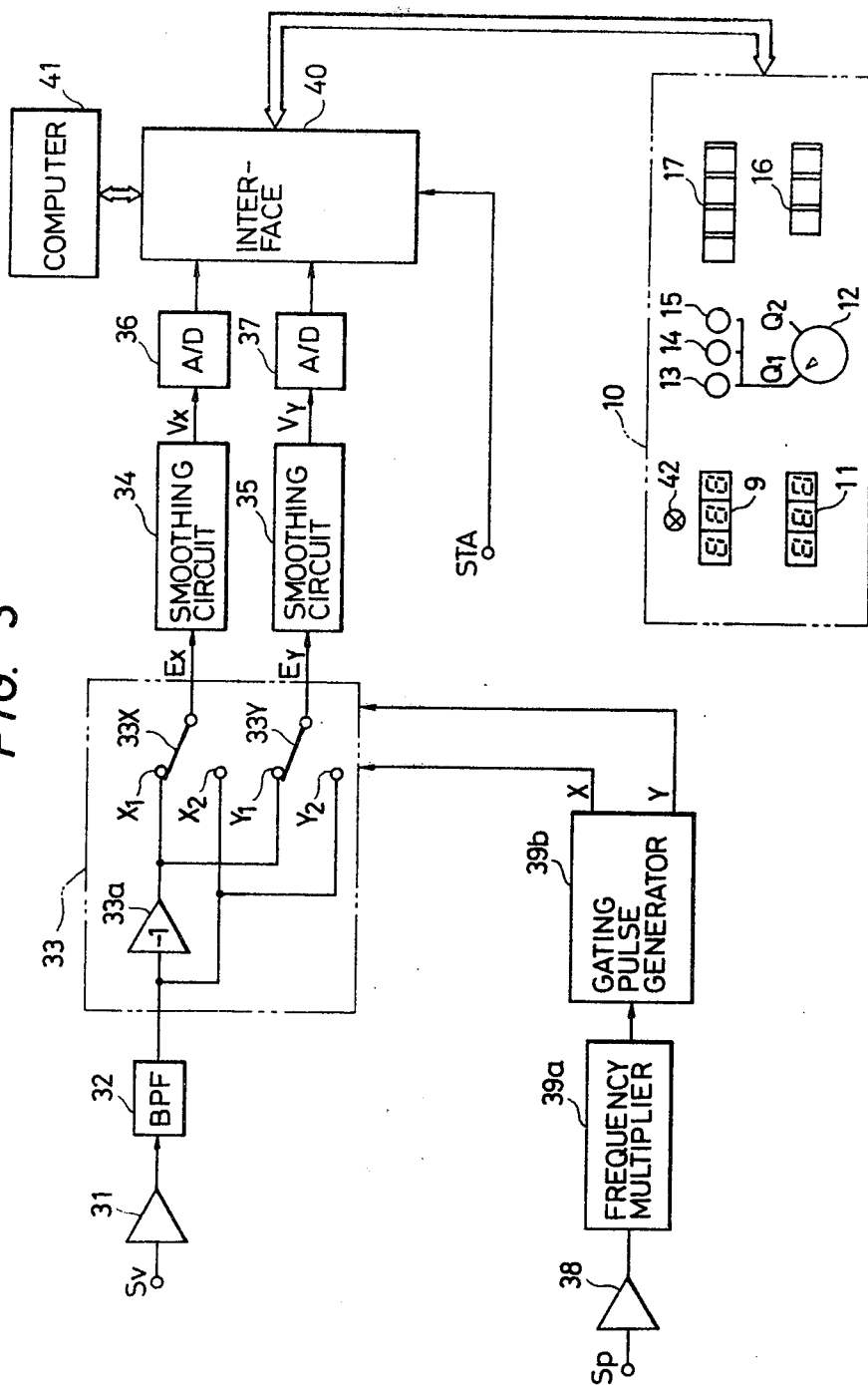
FIG. 3 is an illustration of a block diagram of the unbalance analyzing system of the invention.

FIG. 3 is a schematic diagram of the electrical circuit embodying the present invention. The transducer output signal Sv is coupled to a noise elimination bandpass filter 32 through an amplifier 31 to reject noise introduced into the signal Sv and supplied to synchronous rectifier 33. The reference pulse Sp is applied to a frequency multiplier 39a via an amplifier 38 to multiply the frequency of the reference pulse by a factor of four; the output of frequency multiplier 39a is supplied to a gating pulse generator 39b. This pulse generator is designed to generate two trains of bipolar pulses X and Y as illustrated in FIGS. 2c and 2d with a phase difference of 90° with respect to each other. The synchronous rectifier 33 comprises an inverter 33a having an input connected to the bandpass filter 32, and a pair of analog switches 33x and 33y, first input terminals X₁ and Y₁ of the switches are connected together to the output of the inverter 33a; second input terminals X₂ and Y₂ of the switches are connected together to the input of the inverter 33a. The analog switches 33x and 33y are respectively responsive to the gating control pulses X and Y so the switch output terminals are connected to second input terminals X₂ and Y₂ when the gating pulse is of positive polarity and the switch output terminals are connected to the first input terminals X₁ and Y₂ when the gating pulse is of negative polarity. Therefore, voltage output signals Ex and Ey, having the waveshapes as shown in FIGS. 2e and 2f, are respectively generated at the output terminals of the analog switches 33x and 33y. Signals Ex and Ey are respectively applied to smoothing circuits 34 and 35 to generate d.c. voltages Vx and Vy which represent the average values of the voltages Ex and Ey, as shown in FIGS. 2e and 2f.

In FIG. 4, a voltage Vo represents a combined vector of voltages Vx and Vy; voltage Vo is proportional to the amplitude Xm of the signal Sv and hence to the vector $\vec{U_O}$ of the mechanical vibration with a phase lag of $\delta°$ with respect to vector $\vec{U_O}$. The amount of this phase lag varies as a function of the difference between the angular position of the phase detector 29a and the angular position of a phase difference on the test body 26, and as a function of the amount of a phase shift introduced by the noise elimination filter 32.

From the foregoing, the following relation holds:

$$\vec{U_0} = k\, Vo \angle \delta° \qquad (1)$$
$$= k\angle\delta°(Vx + jVy)$$

where k is a positive real number $\sqrt{-1}$ and j is the imaginary number.

The voltage signals Vx and Vy are supplied to analog-to-digital converters 36 and 37, respectively, the digitally converted signals being applied to an interface 40. A microcomputer 41 is provided to process the digital signals fed to the interface 40 according to the sequence of instructions stored in its memory.

Figure 5:
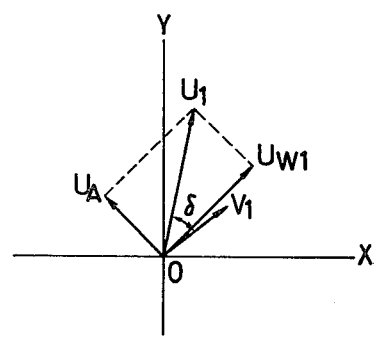
FIG. 5 is an illustration of a vector diagram associated with a first stage of a preliminary test in which unknown values of constants are determined.
Figure 6:
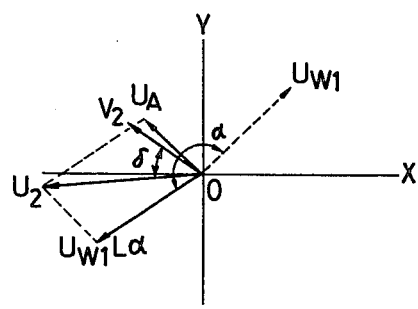
FIG. 6 is a vector diagram associated with a second stage of the preliminary test.
Figure 7:
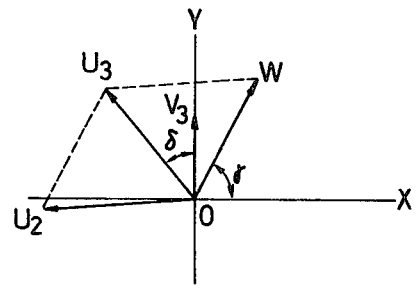
FIG. 7 is a vector diagram associated with a third stage of the preliminary test.

The following is a description concerned with procedures for determining the vector $\vec{U_W}$ of the dynamic unbalance of the test body 26 in terms of the magnitude and angle of unbalance with reference to vector diagrams of FIGS. 5–7.

Let $\vec{U_A}$ be denoted as follows:

$$\vec{U_A} = k\angle\delta°(a + jb) \qquad (2)$$

Since $\vec{U_W} = \vec{U_O} - \vec{U_A}$, $\vec{U_W}$ is given by $$\vec{U_W} = k\angle\delta°\{(Vx - a) + j(Vy - b)\} \qquad (3)$$

The operator now operates a switch 12 on a control panel 10 to a position O₁ to supply an instruction to the computer 41 that the rotating mechanism is set into a preliminary test drive phase.

With the test body 26 being mounted, the motor 18 is energized. After the rotating mechanism is set in a steady state rotation, a measurement start signal STA is applied to the interface 40 from a circuit (not shown) provided in the rotating mechanism. The microcomputer 41 reads digital signals representing voltage signals Vx₁ and Vy₁ to place them in storage. The unbalanced condition is depicted in the vector diagram of FIG. 5 in which the following relation holds:

$$\vec{U_1} = \vec{U_{W1}} + \vec{U_A} \qquad (4)$$
$$= k\angle\delta°(Vx_1 + jVy_1)$$

When the microcomputer places the data Vx and Vy in storage, a lamp 42 is lit to direct the attention of the operator to the fact that the data have been read into the computer. The operator is instructed to depress a switch 13 on the control panel 10 to signal the computer 41 that the data just read into it are associated with a first stage of the preliminary test drive phase corresponding to the vector diagram of FIG. 5. Then the lamp 42 extinguishes.

The motor 18 is de-energized to stop the mechanism. The test body 26 is manually rotated by $\alpha°$ with respect to the mounting base 27, and the motor 18 is again energized to set the mechanism in rotation, which causes the start signal STA to be supplied again to the interface 40 so that the microcomputer 41 reads in voltage data Vx₂ and Vy₂ which are depicted in the vector diagram of FIG. 6. The following relation exists:

$$\vec{U_2} = \vec{U_{W1}}\angle\alpha° + \vec{U_A} \qquad (5)$$
$$= k\angle\delta°(Vx_2 + jVy_2)$$

The lamp 42 is again lit to give an indication that a second data set has been read into the computer. The operator then sets the angle value $\alpha°$ into a digital switch 17 and presses a switch 14 to read this data into the computer. This indicates the status of the data just read into the computer as the data associated with a second phase of the preliminary test phase corresponding to the diagram of FIG. 6.

The motor 18 is again de-energized to stop the rotating mechanism. With the test body 26 being mounted in the same position, a trial dead weight is placed on the test body at a point angularly displaced by $\gamma°$ with respect to the reference angular position. The motor 18 is energized to set the mechanism into rotation. This causes voltage data Vx₃ and Vy₃ to be fed into the computer, which gives the following relation in the vector diagram of FIG. 7:

$$\vec{U_3} = \vec{U_{W1}}\angle\alpha° + \vec{U_A} + \vec{W} \qquad (6)$$
$$= k\angle\delta°(Vx_3 + jVy_3)$$

where W represents the vector of the trial dead weight and is given by $$\vec{W} = w \angle \gamma° \quad (7)$$

where w is the mass of the trial dead weight. The lamp 42 is again lit indicating that the third set of voltage data has been read into the computer. The operator places the mass value w and the angle value $\gamma$ into switches 16 and 17, respectively, and presses a switch 15 to cause the computer to read in the manually placed data, as well as to indicate the status of the data just read therein as the data which are derived in a third stage of the preliminary test phase corresponding to the vector diagram of FIG. 7. Since $\vec{U_3} = \vec{U_2} + \vec{W}$ as seen from FIG. 7, Equations 8 and 9 can be derived from Equations 5, 6 and 7 as follows:

$$k = \frac{w}{\sqrt{(Vx_3 - Vx_2)^2 + (Vy_3 - Vy_2)^2}} \quad (8)$$

$$\delta° = \gamma° - \tan^{-1}\frac{Vy_3 - Vy_2}{Vx_3 - Vx_2} \quad (9)$$

From Equations 2, 4 and 5, the following equations are given:

$$a = \tfrac{1}{2}\{-Vx_1\cos\alpha° + Vy_1\sin\alpha° + Vx_2 + (Vy_1\cos\alpha° + Vx_1\sin\alpha° - Vy_2)\cot(\alpha°/2)\} \quad (10)$$

$$b = \tfrac{1}{2}\{-Vy_1\cos\alpha° + Vx_1\sin\alpha° + Vy_2 + (-Vx_1\cos\alpha° + Vy_1\sin\alpha° + Vx_2)\cot(\alpha°/2)\} \quad (11)$$

where $\alpha \neq 0$.

The computer then operates on the data stored in the first to third stages of the preliminary test phase to compute the Equations 8 to 11. After completion of the computation, the computer extinguishes the lamp 42 indicating the end of the preliminary test phase.

With the values of the constants k, $\delta$, a and b so determined in the preliminary test, it is now possible to proceed with measurement of the dynamic unbalance of the test body. It is to be noted that the preliminary test now allows the measurement of dynamic unbalance in respect of any test body of the same material and size as that used in the preliminary test.

If the test body is the same as that used in the preliminary test, the unbalance measurement is initiated in response to the operator switching the switch 12 to the Q2 position to instruct the computer 41 of the status of the test with the motor 18 being de-energized. From Equation 3, the mass $U_W$ and the angle $\phi_W$ of the unbalance vector $U_W$ are determined as follows:

$$U_W = k\sqrt{(Vx - a)^2 + (Vy - b)^2} \quad (12)$$

$$\phi_W = \delta° + \tan^{-1}\frac{Vy - b}{Vx - a} \quad (13)$$

The computer 41 now proceeds to operate on the Equations 12 and 13 using the now known values of the four constants to determine $U_W$ and $\phi_W$ and displays them on digital indicators 9 and 11, respectively.

If the d.c. voltages Vx and Vy tend to fluctuate even after the rotating mechanism is in steady state rotation due to its spurious vibrations, it is preferable that the computer 41 be programmed to read in the voltage data at periodic intervals to temporarily place them in storage for deriving an average value.

Details of the above described process are now described with reference to flowcharts shown in FIGS. 8a and 8b according to which the computer 41 is programmed.

Figure 8A:
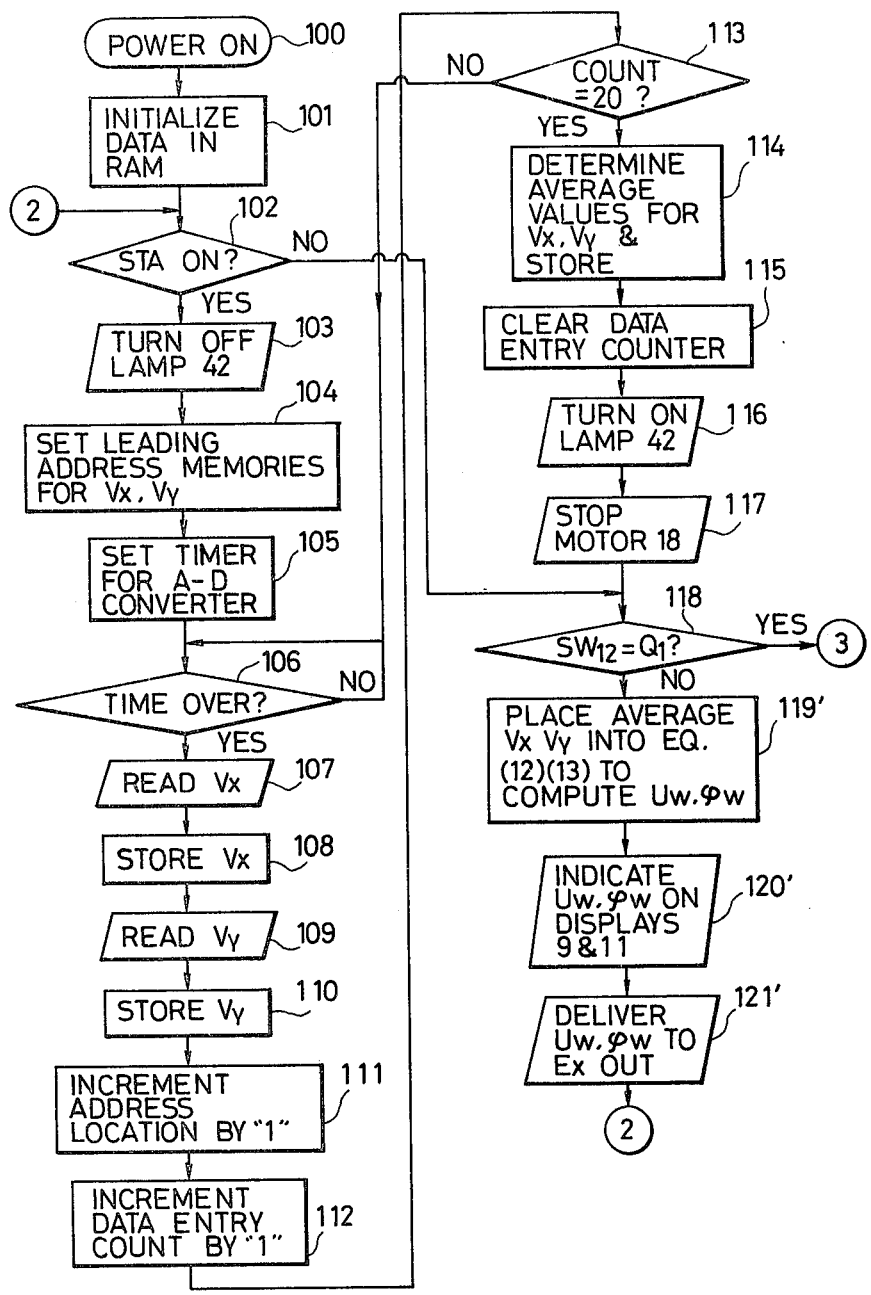
FIGS. 8a and 8b are flowcharts for the operation of the computer of FIG. 3.
Figure 8B:
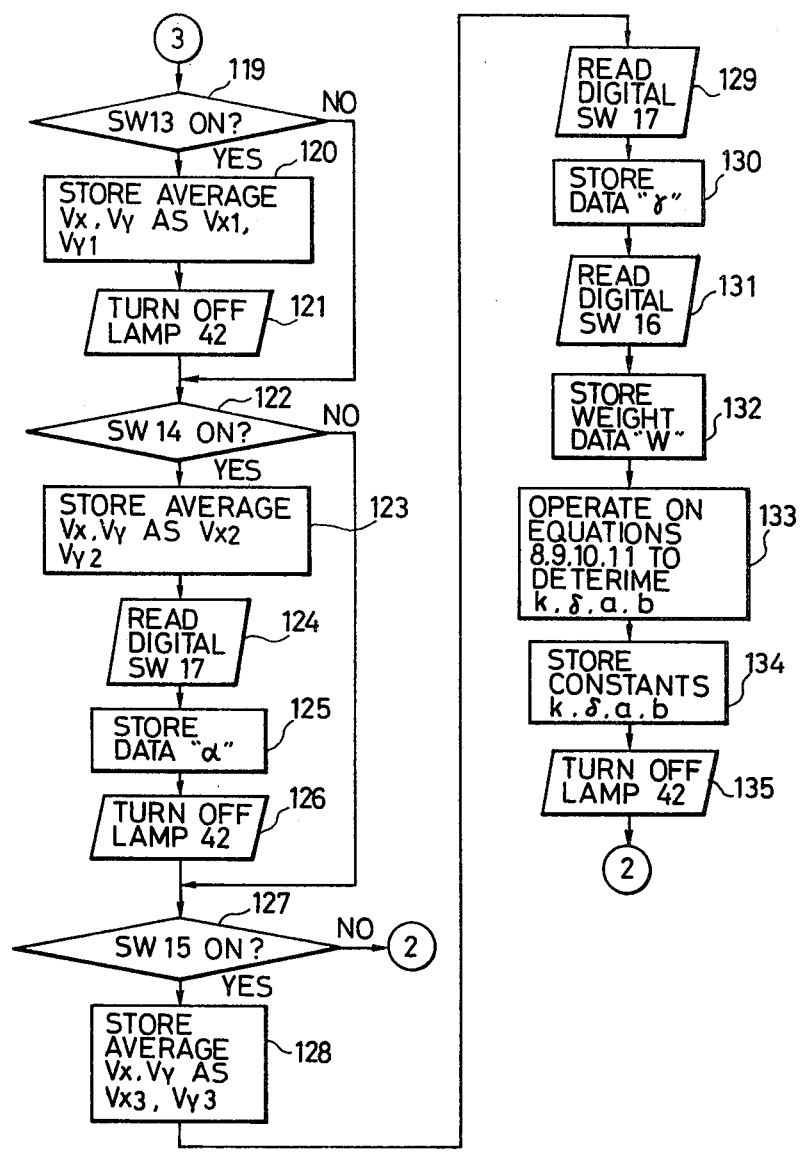

In FIG. 8a, the first stage of the preliminary test is initiated by energizing the motor 18 in step 100. In step 101 all the memory cells of a random access memory (see FIG. 9) of computer 41 are reset to initialize the contents therein. In step 102, the central processing unit (CPU) of the computer checks to see if a start signal STA has been generated, and if so, it proceeds to step 103 to extinguish the lamp 42. In step 104, the leading memory cells of the RAM for Vx and Vy data are addressed, and in step 105, a timer for the analog-to-digital converters is set for counting the conversion time. In step 106, the CPU checks to see if the conversion time is over, and if so, it goes to step 107 to read in data Vx; in step 108 data Vx are placed in storage. Similarly with respect to data Vy, the CPU reads in data Vy in step 109 and places it in storage in step 110. Subsequently in step 111, the address location of the RAM is incremented by "1", and the data entry count is incremented by "1" in step 112. In step 113, the data entry count is checked to detect if it has reached 20, and if not, the control now returns to step 106 to repeat the above process until the data entry count reaches 20. In response to the data entry count value reaching 20, step 114 is executed to seek an average value of the stored data with respect to Vx and Vy and place the average value data in storage in the specified memory cell of the RAM, and the data entry counter is cleared in step 115. The lamp 42 is lit in step 116 to give a visual indication to the operator. In step 117, the motor 18 is manually or automatically switched off to stop the rotating mechanism. The operator then turns the switch 12 to the Q1 position and depresses the switch 13, which is detected successively in steps 118 and 119. In step 120, the average values of Vx and Vy are transferred to locations designated Vx$_1$ and Vy$_1$ of the RAM and in step 121 the lamp 42 is turned off, giving an indication that the first stage of the preliminary test is completed.

The second stage of the preliminary test is initiated with the step 100 to repeat the above process until step 118 is reached. The operator then turns off switch 13 and turns on switch 14, whereby the CPU skips the steps 120 and 121 and goes to step 122 to detect the operating status of the switch 14 and proceeds to step 123 to transfer the average values of Vx and Vy to locations designated Vx$_2$ and Vy$_2$. Since the digital switch 17 is loaded with the angle data $\alpha$, the latter is read off in step 124 and stored in a location designated $\alpha$ in the RAM in the following step 125, the lamp 42 being turned off in step 126 to indicate that the second stage of the preliminary test is completed.

Similarly, the third stage of the preliminary test begins in response to the power being switched ON in step 100 to repeat the steps 101, to 118. Since the switches 13 and 14 are turned off and the switch 15 is turned on by the operator, steps 120, 121, 123 to 126 are skipped, and the stated functions of step 128 are executed to transfer the average values of Vx and Vy to locations designated Vx$_3$ and Vy$_3$. The CPU proceeds to step 129 to read the angle data $\gamma$ and place it in storage at location designated $\gamma$ in the RAM in step 130. The weight data "w" is read and stored in the corresponding location of the RAM in succession in steps 131 and 132 to permit the CPU to operate on the Equations 8, 9, 10 and 11 by substituting therein the stored data to determine the four constants k, δ a, and b, as stated in step 133. These four constants are then stored in the allotted locations of the RAM in step 134 and the lamp 42 is turned off in step 135 to indicate the end of the preliminary test.

The control is now returned to step 102 and thence to step 118. The operator turns the switch 12 to the Q2 position, which instructs the CPU to go to step 119′ to place the average values Vx and Vy into Equations 12 and 13 to derive $U_W$ and $\phi_W$ and indicate the derived values on the display units 9 and 11 in step 120′ and deliver them to the output terminals EXT. OUT in step 121′.

With the four constants being determined in the preliminary testing, dynamic unbalance test can be effected with respect to a test body of the same material and size as that used previously. In this case, the CPU executes the operations of the steps 101 to 118 in succession and goes to step 119′.

In the foregoing description, digital switches 16 and 17 are employed for entry of angle data α and γ and weight data w. In some instances where the test bodies of the same type are checked for unbalance, these data could equally be stored permanently in the computer memory instead of by entering them in storage for each stage of the preliminary test.

The dynamic unbalance can be corrected manually by reading off the data displayed on the digital indicators 9 and 11. The correction could also be effected automatically and for this purpose the same data as applied to the indicators 9 and 11 are delivered from external output terminals EXT OUT to an automatic correcting machine (not shown).

Various modifications of the present invention are possible without departing from the scope of the invention. For example, since the synchronous rectifier usually additionally includes a filter, the noise elimination filter 32 can be eliminated if the amount of spurious vibration of the rotating mechanism is not substantial. Furthermore, the A/D converters 36 and 37 could be replaced with a single A/D converter if the latter is selectively coupled to the outputs of the filters 34 and 35 in response to a signal from the computer by having it programmed appropriately.

In a practical embodiment, the A/D converter is of a type having a 10-bit resolution for 1 volt of an input voltage. This type of A/D converter is available at low cost while assuring precision. A changeover switch may be employed if the range of input voltage exceeds 1 volt for allowing the surplus input voltage to be converted by an additional A/D converter. This can also be accomplished by providing an additional program.

The present invention can equally be applied to horizontal rotating mechanisms in which the test body is rotated about a horizontal axis. In this case, two transducers 30 are linked respectively to opposite ends of the test body mounted horizontally with respect to ground and a set of two unbalance detecting circuits similar to that shown in FIG. 3 is employed.

What is claimed is:

1. An apparatus for analyzing the unbalance of a rotating body comprising: means rotatably supporting the body to permit vibration thereof under the action of an unbalanced mass in the body, a vibration responsive device operatively associated with the body for generating a periodic signal timed in accordance with the vibration of said body, means for dividing said periodic signal into two vector components having a predetermined phase difference therebetween, means for converting said vector components into corresponding d.c. signals, means for converting said d.c. signals into corresponding digital values, and means for digitally processing said digital values to detect the magnitude and angular location of said unbalanced mass, said means for digitally processing including a computer programmed to calculate the following equations:

$$U_W = k\sqrt{(Vx - a)^2 + (Vy - b)^2}$$

$$\phi_W = \delta° + \tan^{-1}\frac{Vy - b}{Vx - a}$$

where, $U_W$ and $\phi_W$ are the magitude and the angular location of said unbalanced mass, respectively, and k, a, b, and δ are constants.

2. An apparatus as claimed in claim 1, wherein said predetermined phase difference is 90 degrees.

3. An apparatus as claimed in claim 1, further comprising:
means for feeding said computer with a first data indicating that said rotating body is located in a first angular position on said supporting means to provide a first preliminary test;
means for feeding said computer with a second data indicating that said rotating body is located in second angular position which is displaced by an angle α with respect to said first position to provide a second preliminary test; and
means for feeding said computer with a third data indicating that dead weight of a known mass w is mounted in an angular position displaced by an angle γ with respect to said first angular position on said rotating body located in said second position, wherein said computer is programmed to calculate said constants in accordance with the following equations:

$$k = \frac{w}{\sqrt{(Vx_3 - Vx_2)^2 + (Vy_3 - Vy_2)^2}}$$

$$\delta = \gamma° - \tan^{-1}\frac{Vy_3 - Vy_2}{Vx_3 - Vx_2}$$

$$a = \tfrac{1}{2}\Big( -Vx_1 \cos \alpha + Vy_1 \sin \alpha + Vx_2 +$$

$$(Vy_1 \cos \alpha + Vx_1 \sin \alpha - Vy_2)\cot\tfrac{\alpha}{2} \Big)$$

$$b = \tfrac{1}{2}\Big( -Vy_1 \cos \alpha - Vx_1 \sin \alpha + Vy_2 +$$

$$(-Vx_1 \cos \alpha + Vy_1 \sin \alpha + Vx_2)\cot\tfrac{\alpha}{2} \Big)$$

(g) calculating the following equations by substituting therein the digital values stored in said first, second and third memories:

$$k = \frac{w}{\sqrt{(Vx_3 - Vx_2)^2 + (Vy_3 - Vy_2)^2}}$$

$$\delta = \gamma° - \tan^{-1}\frac{Vy_3 - Vy_2}{Vx_3 - Vx_2}$$

$$a = \tfrac{1}{2}\Big( -Vx_1 \cos \alpha + Vy_1 \sin \alpha + Vx_2 +$$

$$b = \tfrac{1}{2}\left\{ \begin{array}{c} (Vy_1 \cos \alpha + Vx_1 \sin \alpha - Vy_2)\cot \tfrac{\alpha}{2} \\ -Vy_1 \cos \alpha - Vx_1 \sin \alpha + Vy_2 + \\ (-Vx_1 \cos \alpha + Vy_1 \sin \alpha + Vx_2)\cot \tfrac{\alpha}{2} \end{array} \right\}$$

and;

(h) calculating the following equations by substituting therein the values obtained in the step (g):

$$U_W = k\sqrt{(Vx - a)^2 + (Vy - b)^2}$$

$$\phi_W = \delta° + \tan^{-1}\frac{Vy - b}{Vx - a}$$

where, $U_W$ and $\phi_W$ are the magnitude and the angular location of said unbalanced mass of said body, respectively.

4. A method of analyzing the unbalanced mass of a rotating body using an apparatus having means for rotatably supporting the body to permit vibration to occur under the action of unbalanced masses in said body and said supporting means, means for generating a periodic signal timed in accordance with said vibration, means for dividing said periodic signal into two vector components Vx and Vy, and means for converting the magnitudes of said vector components into corresponding digital values, said method comprising the steps of:

(a) locating said body on said supporting means in a first angular position to permit generation of a first periodic signal;

(b) storing the digital values derived from said first periodic signal in a first memory as $Vx_1$ and $Vy_1$;

(c) moving said body to a second angular position which is displaced by an angle "$\alpha$" with respect to said first position to permit generation of a second periodic signal;

(d) storing the digital values derived from said second signal in a second memory as $Vx_2$ and $Vy_2$;

(e) locating a dead weight of a known mass "w" on said body located in said second angular position in an angular position which is displaced by an angle "$\gamma$" with respect to said first angular position to permit generation of a third periodic signal and;

(f) storing the digital values derived from said third periodic signal in a third memory as $Vx_3$ and $Vy_3$.

5. A method as claimed in claim 4, wherein the step (b) comprises, repetedly storing said digital values at periodic intervals in respective storage locations of said first memory, deriving an average value of the stored digital values with respect to Vx and Vy, and storing the average values in respective storage locations of said first memory as said $Vx_1$ and $Vy_1$; wherein the step (d) comprises, repeatedly storing said digital values at periodic intervals in respective storage locations of said second memory, deriving an average value of the stored digital values with respect to Vx and Vy, and storing the average values in respective storage locations of said second memory as said $Vx_2$ and $Vy_2$; and wherein the step (f) comprises, repeatedly storing said digital values at periodic intervals in respective storage locations of said third memory, deriving an average value of the stored digital values with respect to Vx and Vy, and storing the average values in respective storage locations of said third memory as said $Vx_3$ and $Vy_3$.

* * * * *